Patented Nov. 5, 1940

2,220,621

UNITED STATES PATENT OFFICE 2,220,621

PRINTING INK

Carleton Ellis, Montclair, N. J., assignor to Ellis Laboratories, Inc., a corporation of New Jersey No Drawing. Application January 3, 1938,
Serial No. 183,132

5 Claims. (Cl. 260—31)

This invention relates to printing inks and particularly to typographic inks which can be made to set quickly on paper or other surface to which it is applied. The ink consists as usual, of vehicle and pigment, to which may be added substances such as waxes and soaps to regulate its working properties and thinners of requisite volatility to adjust viscosity to easy distributing consistency.

It is necessary that a printing ink does not dry quickly on the press at ordinary temperatures since this would require frequent cleaning of plate, type and rolls in order to obtain constant clear-cut impressions. On the other hand, drying on the paper should be as rapid as possible; if slow drying, marring of backing pages by offset or sticking together occurs. Also, in multicolor printing time must be allowed for the first colors to dry before the next is applied, whereas if instaneous dry on the paper were possible, the different colors could be impressed one immediately after the other. Printing ink of the type herein described is designed to dry slowly or as little as possible on the press but to dry quickly on the paper. Drying on the paper is accomplished by heat and is accelerated by incorporation of polymerization catalysts in the composition.

The general procedure for making the ink compositions herein described is to provide a substantially linear polyhydric alcohol ester of an unsaturated polybasic acid such as maleic, fumaric, itaconic or citraconic acid. This product varies from a viscous liquid, through a somewhat rubbery to a somewhat brittle solid, depending upon the type of materials used and the degree to which they are reacted. This is dissolved in a solvent (of type later described) and pigment of required color and amount is ground into the solution. A polymerization catalyst is advantageously incorporated to control speed of set-up under heat as shown herebelow.

Maleic anhydride is the preferred olefin polycarboxylic acid material but the other acids above named may be used if desired. Fumaric acid gives a quicker-curing polyester than maleic. Unless suitably modified, the polybasic acid should be dibasic. Also certain polybasic acids, such as malic and citric, decompose on heating, at least in part, into acids of the maleic type, and the temperature of reaction should be adequate to accomplish the decomposition to a sufficient extent.

Dihydric alcohols are the usual kind of polyhydric alcohols which react with dibasic acids to yield linear molecules or linear polyesters. Diethylene glycol is readily available; others include ethylene glycol, triethylene glycol, trimethylene glycol, monoethylin, and propylene glycol and its derivatives. Ethylene glycol produces a final hardened product which is very hard but somewhat brittle; triethylene glycol shows softness but greater toughness. Mixtures of dihydric alcohols may be used. A certain amount of an alcohol containing more than two hydroxyl groups (e. g., glycerol or sorbitol) can be used with the dihydric alcohol; also some monohydric or a mixture of monohydric alcohols, provided the effect of the linear, high-molecular structure is not lost.

A linear structure is preferred since this permits reacting the mixture of maleic material and polyhydric alcohol sufficiently long to obtain an ester of low acid number (high molecular weight) which is soluble. In the final cure the linear molecule is converted to a molecule of the 3-dimensional type (insoluble and infusible) by some form of cross-linkage between the linear molecules. The higher the molecular weight (or the longer the molecule) the more points (maleic double bonds) there are available for cross-linkage. Consequently the cure is faster and a lower temperature and smaller amount of catalyst are permissible to bring about the change.

If an unsaturated acid like maleic is esterified with a monohydric alcohol such as methyl or ethyl, the alkyl ester thus obtained is not a linear molecule; that is, it is not of extensive length. Such esters can be polymerized but the polymerization products are permanently soluble and fusible. In the present invention the initial resinous products comprising linear molecules are alkylene maleates of high molecular weight. As prepared they are polymerized in the sense that they are condensation polymers. Condensation-polymerized alkylene maleates are converted to the cured form by addition polymerization.

When light color is of minor importance the mixture of polyhydric alcohol and maleic material can be heated in an open vessel. However, for light-colored products it is advisable to prepare the alkylene ester in an inert atmosphere; that is, carbon dioxide, nitrogen or illuminating gas (free from sulphur compounds) is bubbled through the reaction mixture. This serves to preserve the light color of the polyester and assists reaction by removing water as formed. Also, for the lightest color (water-white) the raw materials are distilled in vacuum and used as soon as possible after distillation. The temperature range in making the ester is in general between about 170° and 230° C. If the temperature is too low the reaction is slow and if too high there is difficulty in stopping the reaction at the desired stage. As soon as the acid number of the product has been reduced to the required point, which is in general below about 60 and preferably between about 5 and 50, the ester product is allowed to cool.

The alkylene maleate product can be cured without added catalyst but a relatively long time is required. Hence, a curing catalyst is incorporated with the composition in amount, in general, between about .1 and 4% by weight. Curing catalysts include peroxides, ozonides, perhalides, peracids, oxygen and ozone, and their activity is influenced by temperature. Benzoyl peroxide is particularly effective. Acetyl, acetylbenzoyl and phthalyl peroxides are also satisfactory, as well as cyclohexene peroxide and airblown dioxane. Air or oxygen, particularly in the presence of a soluble cobalt salt, may be bubbled through a liquid composition until an influential amount is absorbed. Stannic chloride shows some activity. It has been found that inorganic peroxides such as those of barium, zinc, magnesium and lead show greatly decreased curing effect over the organic peroxides mentioned, probably because of lower solubility.

Pigments depend upon the color desired and also upon their effect on the alkylene maleate. Lakes which bleed readily into the vehicle are undesirable since the dissolved dyestuff generally retards set-up. Therefore, pigments which are inert to polymerization are preferred. Another restriction is basicity of the pigment. Unless the alkylene ester is of very low acid number, neutral coloring agents should be chosen since basic pigments are liable to cause livering. Blacks represent the most generally used color. Carbon black has a slight retarding effect on polymerization but this action can be counteracted by a slight increase in catalyst.

Solvents used herein are preferably high boiling. Their rate of evaporation at ordinary temperatures should be such that the ink remains workable on the press for a prolonged period. Such liquids include alkyl esters of oxalic, succinic and malonic acids, the alkyl ethers of glycols such as the ethyl and butyl ethers of ethylene and diethylene glycol, dichloroethyl ether, dichlorobenzene and the like. Another type of high boiling solvent is one that enters the final ink film by conjoint polymerization with the alkylene maleate, such as alkyl esters (ethyl or methyl) of maleic or fumaric acid. Still another type of solvent capable of conjoint polymerization with alkylene maleates includes vinyl derivatives. However, most of these are too volatile with the exception of styrene which is very effective in producing a quick set. Liquids such as rosin oil and lubricating oils are non-solvents but can be used along with more effective solvents to influence the working properties of the ink, the amount used being insufficient to cause strike-through on the paper. Immiscible waxes and soaps may also be incorporated, as mentioned above, where the use is of advantage.

To assist the solvent (that is, the high-boiling feature of the solvent in preventing drying as much as possible at ordinary temperatures), it is advantageous to add a substance which retards polymerization. Preferably this substance is one which has no retarding action at high temperatures or has sufficient volatility that it is eliminated along with the solvent or thinner. Phenol, cresols and guaiacol are examples of antipolymerization agents. Polyhydric phenols are more effective than monohydric, but their action is less readily eliminated from the applied ink.

Plasticizers represent additions which may be made to the compositions to obtain products which are less brittle. Although polyglycols and glycerol are compatible with the alkylene ester, a water-insoluble plasticizer is generally preferred, such as the phthalate of diethylene glycol monoethyl ether, sucrose octacetate, camphor, diethylene glycolphthalate, glycol succinate, diethylene glycol oxalate and glycol benzoate-phthalate. Liquids such as tricresyl phosphate, triethyl citrate and triacetin are also miscible with the unpolymerized composition.

Another method of influencing the properties of the final polymer is to replace part of the maleic material by another polybasic acid, preferably dibasic such as phthalic, succinic, oxalic, or sebacic acid. As high as two moles of phthalic to one mole of maleic acid can be used and still get satisfactory results. The hardened resin is tougher and more flexible and, although the curing time is increased somewhat over the straight maleic product, a judicious amount of phthalic anhydride to form a mixed maleic-phthalic glycol ester serves to lower the cost. Also a part of the maleic may be replaced by a monobasic acid (preferably light colored and heat-stable) such as acetic, benzoic, benzoylbenzoic or cinnamic, but in this case the size of the ester molecule is limited since extended chain-growth does not occur at the monobasic acid radicals. When monobasic acids are used it is possible to replace the glycol by glycerol. For example, a monoglyceride of the monobasic acid is provided and this is esterified with the maleic material.

The following examples illustrate the invention but are not to be considered as limiting since the formulas may be varied widely as to proportions of ingredients, types of alkylene esters of acids of the maleic type and modifiers of composition. Parts are by weight.

*Example 1.*—20 parts of diethylene glycol maleate (formed by heating a mixture of one mole of diethylene glycol and one mole of maleic anhydride at 180°–210° C. until a viscous ester having an acid number of 26 and a drop of which gels in 6 seconds on a Wood's metal bath at 193° C.) were mixed with 4 parts of the maleate of diethylene glycol monoethyl ether and 0.48 part of benzoyl peroxide. The homogeneous, clear solution which was obtained was ground with 3.2 parts of carbon black and 0.32 part of Prussian blue until a smooth paste was produced. The consistency was about that of a short ink. When printed on paper and the paper heated at 160° C. for 30 seconds the ink dried so that it would not smudge with vigorous rubbing and did not off-set when pressure was applied to its reverse side.

*Example 2.*—20 parts of diethylene glycol maleate having an acid number of 26 were mixed with 4 parts of dichloroethyl ether, 1 part of styrene and 0.6 part of benzoyl peroxide. The liquid was ground with 3.2 parts of carbon black until a smooth paste resulted. The consistency of the paste was about that of a long ink. A sheet of paper printed with the composition and subjected to a temperature of 160° C. for 30 seconds, dried to a non-smudge condition. When 0.07 part of cobalt naphthenate was added to the composition the cure time was lowered to about 20 seconds.

*Example 3.*—20 parts of diethylene glycol maleate were mixed with 5 parts of diethyl oxalate, 1 part of styrene, 0.8 part of benzoyl peroxide and 0.07 part of cobalt naphthenate. The liquid was ground with 4 parts of carbon black until a smooth paste was obtained with a consistency of a long ink. A paper sheet printed with the ink dried smudge-free in 15 seconds at 160° C.

Example 4.—20 parts of diethylene glycol maleate were mixed with 4 parts of diethyl oxalate, 1 part of styrene, 0.8 part of benzoyl peroxide and 0.07 part of cobalt naphthenate. 0.07 part of phenol was added to function as a stabilizer. The liquid was ground with 4 parts of carbon black to obtain a smooth paste. A printed sheet of paper using the above composition dried rubproof in 30 seconds in an oven at 160° C.

Example 5.—20 parts of diethylene glycol maleate were mixed with 5 parts of diethyl oxalate, 0.8 part of benzoyl peroxide and 0.07 part of cobalt naphthenate. The liquid was ground with 4 parts of carbon black to give a paste of long ink consistency which cured on a printed page in less than 30 seconds at 160° C.

Example 6.—20 parts of diethylene glycol maleate were mixed with 5 parts of dichlorobenzene, 0.8 part of benzoyl peroxide and 0.07 part of cobalt naphthenate. The liquid was ground with 4 parts of carbon black yielding a composition with the consistency of long printing ink. Paper printed with the above composition and subjected to a temperature of 160° C. for 15 seconds gave a printed sheet which would not smudge nor off-set.

Example 7.—20 parts of glycerol-triethylene glycol maleate (formed by heating a mixture of one mole of glycerol, 3 moles of triethylene glycol and 4 moles of maleic anhydride to 190°–200° C. until a viscous ester having an acid number of 49 and a drop of which gelled in 2 to 4 seconds on a Wood's metal bath at 200° C.) were mixed with 5 parts of p-dichlorobenzene, 0.8 part of benzoyl peroxide and 0.07 part of cobalt naphthenate. The liquid was ground with 4 parts of Permanent Red F4RH until a smooth paste resulted. A sheet of paper printed with the above red ink, cured to a non-smudge condition, when heated to 160° C. for 15 seconds. The ink did not dry overnight at room temperature.

What I claim is:

1. A printing ink which is substantially non-drying at ordinary temperatures and dries rapidly under heat when applied to a surface in a thin film, comprising coloring matter dispersed in a viscous vehicle consisting essentially of a dihydric alcohol polyester of an unsaturated dicarboxylic acid selected from the group consisting of maleic, fumaric, citraconic and itaconic acids, said polyester being capable of further polymerization under the influence of heat to a substantially insoluble and infusible form, and an organic solvent substantially non-drying and non-volatile at ordinary temperatures for said polyester, the proportion of said solvent being sufficient to render said ink workable on a press.

2. A printing ink which is substantially non-drying at ordinary temperatures and dries rapidly under heat when applied to a surface in a thin film, comprising coloring matter dispersed in a viscous vehicle consisting essentially of a dihydric alcohol polyester of an unsaturated dicarboxylic acid selected from the group consisting of maleic, fumaric, citraconic and itaconic acids, said polyester being capable of further polymerization under the influence of heat to a substantially insoluble and infusible form, and an organic solvent substantially non-drying and non-volatile at ordinary temperatures for said polyester, the proportion of said solvent being sufficient to render said ink workable on a press, and an oxygen compound capable of accelerating change of said alkylene polyester to a substantially insoluble and infusible form.

3. The product of claim 2 in which the polyester is a maleate of a dihydric alcohol and the oxygen compound accelerating cure is benzoyl peroxide.

4. The product of claim 2 in which the polyester is diethylene glycol maleate and the oxygen compound is benzoyl peroxide.

5. A printing ink which is substantially non-drying at ordinary temperatures and dries rapidly under heat when applied to a surface in a thin film, comprising coloring matter dispersed in a viscous vehicle consisting essentially of a dihydric alcohol polyester of an unsaturated dicarboxylic acid selected from the group consisting of maleic, fumaric, citraconic and itaconic acids, said polyester being apable of further polymerization under the influence of heat to a substantially insoluble and infusible form, and a solvent for said polyester capable of cojoint polymerization with said polyester, said solvent being substantially non-drying and non-volatile at ordinary temperatures, the proportion of said solvent being sufficient to render said ink workable on a press, and an oxygen compound capable of accelerating change of said polyester to a substantially insoluble and infusible form.

CARLETON ELLIS.